United States Patent [19]

Salvagnini

[11] Patent Number: 4,534,255
[45] Date of Patent: Aug. 13, 1985

[54] SHEARING MACHINE FOR METAL SHEET HAVING BLADES AT RIGHT ANGLES CONSISTING OF MUTUALLY MOVABLE SEGMENTS

[75] Inventor: Guido Salvagnini, Sarego, Italy

[73] Assignee: Salvagnini Transferica S.p.A., Sarego, Italy

[21] Appl. No.: 497,713

[22] Filed: May 24, 1983

[30] Foreign Application Priority Data

Jun. 9, 1982 [IT] Italy .............................. 21778 A/82

[51] Int. Cl.³ .............................................. B26D 5/12
[52] U.S. Cl. ........................................ 83/530; 83/563; 83/620; 83/638; 83/694
[58] Field of Search ................ 83/620, 622, 624, 638, 83/563, 639, 640, 641, 519, 527, 694, 530

[56] References Cited

U.S. PATENT DOCUMENTS

| 3,298,267 | 1/1967 | Schmid et al. | 83/530 |
| 3,424,045 | 1/1969 | Breetvelt | 83/694 |
| 3,706,251 | 12/1972 | Wheeler et al. | 83/640 |
| 3,828,639 | 8/1974 | Roch | 83/620 |
| 3,933,070 | 1/1976 | Walters et al. | 83/530 |
| 3,935,778 | 2/1976 | Pretty | 83/639 |
| 3,971,281 | 7/1976 | Bredow et al. | 83/636 |
| 4,367,669 | 1/1983 | Legorburu | 83/608 |
| 4,483,227 | 11/1984 | Camisa | 83/559 |

FOREIGN PATENT DOCUMENTS 290451 5/1928 United Kingdom .................. 83/641

Primary Examiner—Frank T. Yost
Assistant Examiner—Hien H. Phan
Attorney, Agent, or Firm—Stevens, Davis, Miller & Mosher

[57] ABSTRACT

A shearing machine for metal sheets having a pair of upper mobile and lower stationary cooperating blades, each blade having two segments mounted perpendicular to each other.

The two segments at right angles of the mobile blade are movable independently either with respect to each other or with respect to the common support so that, in turn each segment is able to execute cut strokes of different lengths in order selectively to engage one and/or the other of the segments. Each of them is able to execute cuts longer than its own longitudinal extension.

15 Claims, 3 Drawing Figures

SHEARING MACHINE FOR METAL SHEET HAVING BLADES AT RIGHT ANGLES CONSISTING OF MUTUALLY MOVABLE SEGMENTS

BACKGROUND OF THE INVENTION

This invention relates to a shearing machine for metal sheet having blades at right angles consisting of mutually movable segments.

The most commonly used shearing machines have a pair of rectilinear blades, whose motion causes cutting of an interposed metal sheet. In this case the cut can only be passing through, that is from one edge of the metal sheet to the opposite one.

A type of shearing machine is known whose blades are square shaped, i.e. consisting of two segments at right angles. In this case the cut is not necessarily running from one edge to the opposite one, but it can run also from one edge to a contiguous one.

Therefore the such a shearing machine with blade segments at right angles to each other has a greater flexibility and can afford better results as far as the minimization of the off-cuts is concerned.

A known improvement of this last type of shearing machine comprises having placed two shear-blades inclined relative to each other and operating the slide that supports the movable blade with two different stroke lengths, which can be selected, i. e. a smaller one which engages with the metal sheet only one of the two segments of the blade and the bigger one which engages both of them.

In this way, by means of a sequence of shorter strokes of the movable blade, the first of the two segments is able to execute a sequence of aligned (cuts) meanwhile the metal sheet is advancing parallely to said segment) before a longer final stroke of the same movable blade ends, by engaging also the second segment, the above-mentioned sequence of cuts by means of a transversal cut. With this system the above-mentioned first segment is thus able to execute cuts of a length longer than its own longitudinal extension.

The same operation can not be performed by the second segment as repeated cuts by the last-one would be unavoidably accompanied by unwanted contemporaneous cuts by the first segment.

SUMMARY OF THE INVENTION

The object of this invention is a shearing machine having blades at right angles, which enables cuts of any length with both the segments or a single segment of the movable blade.

According to this invention this object is now achieved by a shearing machine comprising a pair of blades at right angles supported by respective supports movable with respect to each other, where each blade comprises of two segments substantially at right angles to each other characterized in that said segments of one of the blades is independently movable with respect to the other segment.

It appears evident that, having a blade with two independently movable segments, it is possible selectively to cause one segment to work and the other one to remain disengaged, and viceversa, so that the engaged one can operate several times to perform cuts of length longer than its longitudinal extension and leave then the same possibility to the one initially disengaged. At the corner of the metal sheet it is at last possible to have the final cut performed by both segments. It is thus possible by means of the shearing machine according to this invention to obtain, the highest capacity and flexibility of working for cutting metal sheet according to the various shapes and with minimum waste.

BRIEF DESCRIPTION OF THE DRAWINGS

The features of this invention will be made more evident by the following detailed description of an embodiment illustrated by way of a non-limitative example in the enclosed drawings, in which.

DESCRIPTION OF A PREFERRED EMBODIMENT

Figure 1:
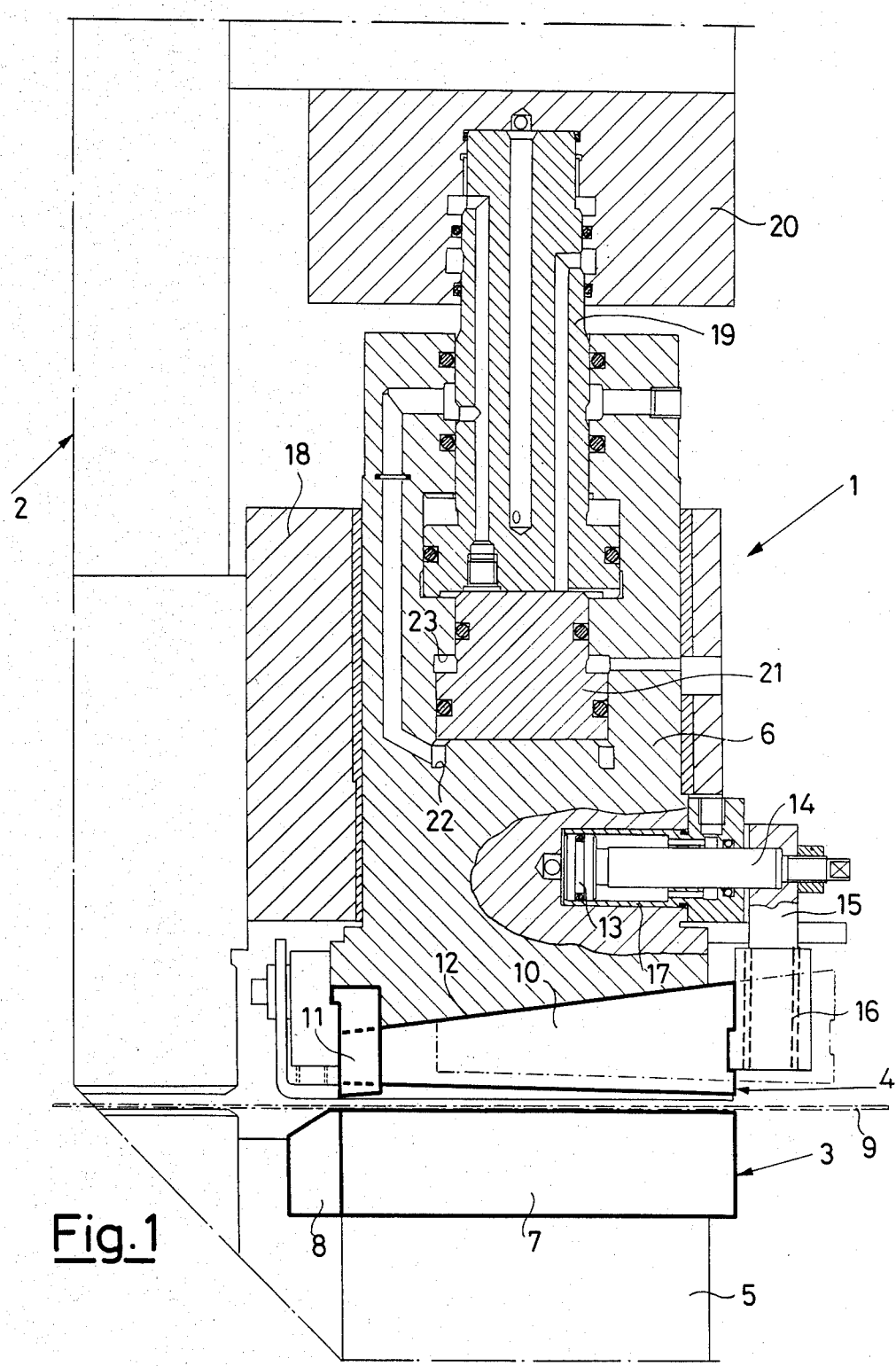
FIG. 1 is a longitudinal section and view of a shearing machine according to this invention taken along the main advancement direction of the metal sheet.

With reference to FIG. 1, a shear 1 according to this invention is supposed to be joined to another machine for processing metal sheets, like for example a punching machine 2. However it can be joined to a different machine or also be used alone.

The shear 1 comprises two blades 3 and 4 at right angles, the first one being supported by a lower stationary support 5 and the second one by an upper movable support or slide 6 movable vertically downward and upward with respect to the stationary support 5.

Figure 3:
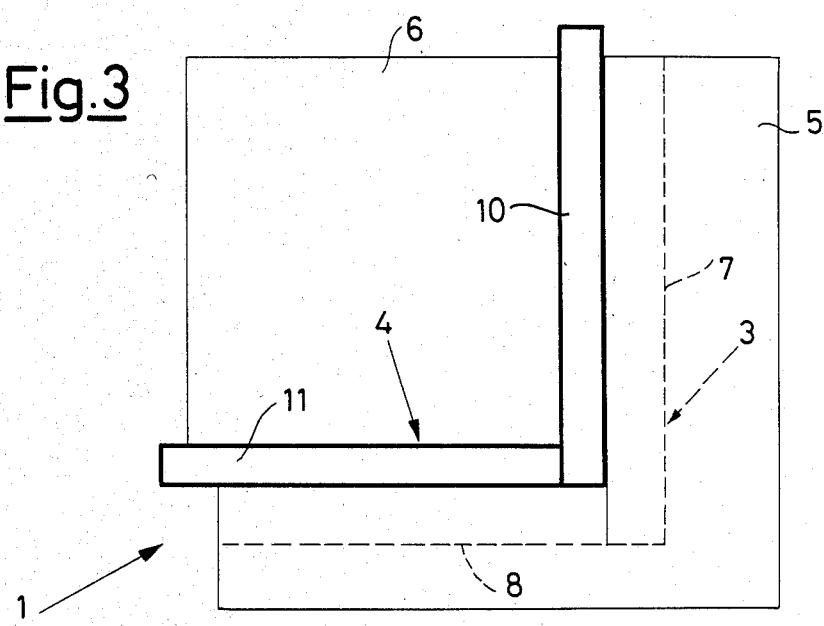
FIG. 3 shows the two pairs of the shear-blades as viewed from the bottom with respect to FIG. 2.

The stationary blade or cutting counterblade 3 consists of two segments 7 and 8 placed at right angles as shown in FIG. 3. They define a common plane for supporting the metal sheet, schematically represented and shown by reference numeral 9 in FIG. 1.

The movable blade or cutting blade 4 in turn consists of two segments 10 and 11 correspondingly located at right angles as shown in FIG. 3. Their cooperation with the underlying segments 7 and 8 of the stationary blade 3 causes cutting of an interposed metal sheet. Segment 10 is longitudinal with respect to the path of movement of sheet metal through the apparatus and segment 11 is transverse thereto.

Figure 2:
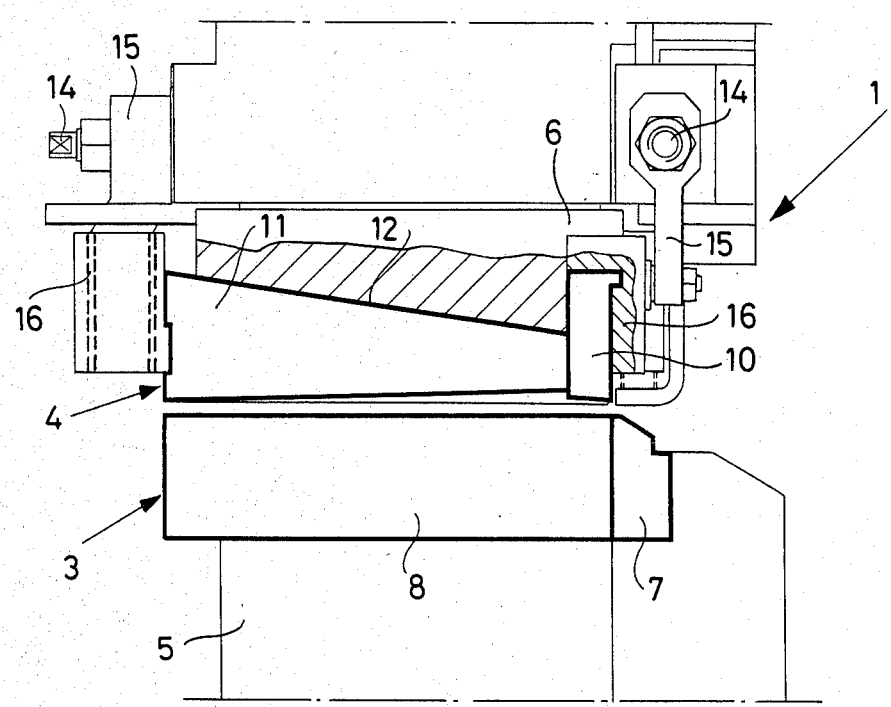
FIG. 2 is a frontal view of the mouth of said shearing machine taken from the right with respect to FIG. 1.

Both the longitudinal segment 10 and the transverse segment 11 of the movable blade 4 are independently movable with respect to the common support 6 from the respective working positions of FIG. 1 and 2, where the two segments are shown both inclined and converging towards a corner which represents the most removed point from the stationary blade 3.

For both the segments 10 and 11 the displacement may be obtained along an inclined plane 12 with a perpendicular component towards the working plane of the metal sheet and, as shown in dotted line in FIG. 1, allows lifting progressively of the lowest cutting part of the segment with respect to the corresponding segment of the stationary blade. In this way either of the two segments 10 and 11 of the movable blade can be brought selectively into a position of disengagement to leave the other one free to execute the metal sheet cut.

The above-mentioned displacement is driven for each of the two segments, by a respective hydraulic piston 13 (FIG. 1), whose connecting rod 14 is connected with an arm 15 which in turn is connected with a segment carrying slide 16 (FIGS. 1 and 2). As shown in FIG. 1, this piston 13 is arranged slidingly in a cylinder 17 fitted in and made integral with the body of the movable support 6.

The movable support 6 is in turn driven in its vertical motion within an outer shell 18 and by a inner tang 19 supported from the top by a head 20. It is furthermore foreseen that a central movable nucleus 21 which properly shaped and fed with oil or another fluid in the various hollows shaped within this nucleous, said support and said tang, allows suitable movable support 6 to execute, according to the control means, either of two down strokes of different lengths.

The above-mentioned structure makes possible the following way of working of the shear shown in the drawings. When it is desired to execute at first a sequence of longitudinal cuts, the transversal segment 11 of the movable blade 4 is lifted along its respective inclined plane 12 by actuation of the relative piston 13. On the contrary the longitudinal segment 10 remains in the working position shown by a continuous line in FIG. 1, i.e. in a lower position with respect to the transversal segment 11. By feeding oil (or another fluid) in the lower hollow 22 shaped in the movable support 6 under the central nucleous 21, then the movable support or slide 6 can be driven to execute a downward stroke of short length which allows the longitudinal segment 10 of the cutting blade 4 to engage the underlying metal sheet 9 in order to cause its longitudinal cut in cooperation with the underlying and contiguous longitudinal segment of the counterblade 3. The retracted transversal segment 11 is not able to engage the metal sheet.

By alternating a sequence of such downward strokes of the movable support 6 with as many upward strokes (controlled by feeding oil in the intermediate hollow 23 shaped between the movable support 6 and the central nucleous 21), the longitudinal segment 10 is able to execute, in combination with a proper advancement of the metal sheet, a sequence of aligned cuts which, together, produce cut whose length is longer than the length of segment 10.

The same operation can be repeated for other parallel longitudinal cuts, afterwards one can execute transversal cuts by moving the transversal segment 11 of the movable blade 4 into its working position and lifting the longitudinal segment 10 into the position shown in dot and line in FIG. 1. By means of one or more downward strokes of reduced length of the movable support 6 it is then possible to cause transversal cuts having equal or longer length than that of the transversal segment 11, this time in cooperation with the transversal segment 8 of the counterblade 3 and proper displacements of the metal sheet 9.

When a corner of the metal sheet is reached it is then possible to execute a final cut at right angles by allowing the movable support 6 to perform a stroke of greater length, which causes the engagement of both the segments 10 and 11 of the movable blade 4 with the underlying metal sheet 9. This greater stroke is caused by feeding oil into a higher hollow 24 shaped between the central nucleous 21 and the upper fixed tang 19.

Of course, the drawings illustrate only one of the possible ways to practice this invention. This applies particularly to the control of the movements of the slide 6, to the displacement control of the movable segments 10 and 11 and lastly to the inclination of the lowest cutting part of the same segments 10 and 11. In addition to the embodiment shown in the drawings the cutting part of both the segments can have an increasing inclination with respect to the stationary counterblade 3.

I claim:

1. A shearing machine for sheet metal comprising upper and lower cooperating blades positioned for shearing action therebetween, each blade having two perpendicular segments, the lower blade being carried by a stationary support and the two upper blade segments being carried by a single vertically reciprocating support, wherein each segment of the upper blade is movably connected to said single reciprocating support so as to be selectively independently displaceable with respect to the other segment and to said reciprocating support in order to vary the vertical distance of the selected segment from the lower blade and selectively to remove said selected segment from the shearing action.

2. A shearing machine according to claim 1, wherein said segments of the upper blade are displaceable along respective inclined paths.

3. A shearing machine according to claim 1, wherein driving means are provided for imparting to said reciprocating support selectively alternated shorter and longer vertical strokes.

4. A shearing machine for sheet metal comprising:
   upper and lower blades positioned for shearing action therebetween, each blade comprising two segments with the segments of each blade being generally perpendicular to each other so as to form two generally "L" shaped blades;
   means supporting the lower blade in a stationary position and a single common moveable support for both segments of the upper blade supporting them for generally vertical movement toward and away from the lower blade;
   means for moving each of the segments of the upper blade vertically in relation to said common support so that upon movement of said common support toward said stationary lower blade, either or both of said upper blade segments will be positioned for shearing action with the corresponding segment of the lower blade.

5. The machine of claim 4 in which the common support is moved by a fluid operated cylinder.

6. The machine of claim 4 in which the means for moving each of the segments of the upper blade is a fluid operated cylinder connected to move the blade for vertical movement thereof.

7. The machine of claim 4 in which the segments of the upper blade each have an inclined edge bearing against a surface of the common support and each segment has associated means for movement of the segment along its length with the inclined edge moving in relation to its bearing surface.

8. The machine of claim 7 in which the means for movement of the segment is a fluid operated cylinder.

9. The machine of claim 4 including means for operating the common moveable support over a short vertical stroke and a long vertical stroke.

10. A shearing machine for sheet metal comprising:
    upper and lower blades positioned for shearing action therebetween, each blade comprising two segments with the segments of each blade being generally perpendicular to each other so as to form two generally "L" shaped blades;
    means supporting the lower blade in a stationary position and a single common vertically moveable support for both segments of the upper blade supporting them for generally vertical movement toward and away from the lower blade;

at least one of the segments of the upper blade being mounted for generally vetical movement in relation to said common support so that said segment may be retracted from shearing action with the corresponding segment of the lower blade when such shearing action would otherwise take place due to movement of said common support toward the stationary lower blades and means for moving said at least one segment.

11. The machine of claim 10 in which the common support is moved by a fluid operated cylinder.

12. The machine of claim 10 in which the means for moving said at least one segments of the upper blade is a fluid operated cylinder connected to move the blade for vertical movement thereof.

13. The machine of claim 10 in which said at least one segment of the upper blade has an inclined edge bearing against a surface of the common support and said segment has associated means for movement of the segment along its length with the inclined edge moving in relation to its bearing surface.

14. The machine of claim 13 in which the means for movement of the segment is a fluid operated cylinder.

15. The machine of claim 10 including means for operating the common moveable support over a short vertical stroke and a long vertical stroke.

* * * * *